United States Patent
Skertic (10) Patent No.: US 10,883,377 B2
(45) Date of Patent: Jan. 5, 2021

(54) SYSTEM AND METHOD OF CONTROLLING TIP CLEARANCE IN A SHROUD ASSEMBLY FOR A BLADED DISC

(71) Applicant: Rolls-Royce North American Technologies Inc., Indianapolis, IN (US)

(72) Inventor: Richard J. Skertic, Carmel, IN (US)

(73) Assignee: Rolls-Royce North American Technolgies Inc., Indianapolis, IN (US)

(*) Notice: Subject to any disclaimer, the term of this patent is extended or adjusted under 35 U.S.C. 154(b) by 134 days.

(21) Appl. No.: 16/168,967

(22) Filed: Oct. 24, 2018

(65) Prior Publication Data
US 2019/0128135 A1 May 2, 2019

Related U.S. Application Data

(60) Provisional application No. 62/577,845, filed on Oct. 27, 2017.

(51) Int. Cl.
| | |
|---|---|
| *F01D 11/22* | (2006.01) |
| *F01D 11/24* | (2006.01) |
| *F01D 25/24* | (2006.01) |
| *F01D 25/14* | (2006.01) |

(52) U.S. Cl.
CPC ............ *F01D 11/22* (2013.01); *F01D 11/24* (2013.01); *F01D 25/14* (2013.01); *F01D 25/24* (2013.01); *F05D 2240/11* (2013.01); *F05D 2260/213* (2013.01); *F05D 2270/303* (2013.01); *F05D 2300/612* (2013.01)

(58) Field of Classification Search
None
See application file for complete search history.

(56) References Cited

U.S. PATENT DOCUMENTS

| | | | | |
|---|---|---|---|---|
| 4,419,044 A | * | 12/1983 | Barry | F01D 11/24 415/117 |
| 4,513,567 A | * | 4/1985 | Deveau | F01D 11/08 415/178 |
| 5,203,673 A | * | 4/1993 | Evans | F01D 11/22 415/10 |
| 5,593,276 A | | 1/1997 | Proctor et al. | |
| 6,082,963 A | * | 7/2000 | Sexton | F01D 11/24 415/115 |
| 6,120,242 A | * | 9/2000 | Bonnoitt | F01D 21/045 415/174.4 |
| 6,422,807 B1 | * | 7/2002 | Leach | F01D 11/24 415/1 |
| 6,644,045 B1 | * | 11/2003 | Tang | F01C 11/002 62/116 |
| 7,086,233 B2 | | 8/2006 | Chehab et al. | |

(Continued)

*Primary Examiner* — Brian P Wolcott
*Assistant Examiner* — Jason G Davis
(74) *Attorney, Agent, or Firm* — Brinks Gilson & Lione (57) ABSTRACT

An assembly in a turbine engine having a dynamically moveable flowpath boundary member for encasing a rotatable bladed disc and maintaining a clearance gap between the flowpath boundary member and the blade tips of the bladed disc. The assembly comprises a static casing, a flowpath boundary member carried by the casing, and a refrigeration system configured to remove heat from the flowpath boundary member to thereby thermally expand and contract the flowpath boundary member to control blade tip clearance.

19 Claims, 7 Drawing Sheets

(56) References Cited

U.S. PATENT DOCUMENTS

| | | | |
|---|---|---|---|
| 7,269,955 B2 | 9/2007 | Albers et al. | |
| 7,434,402 B2 * | 10/2008 | Paprotna | F01D 11/24 415/115 |
| 7,708,518 B2 | 5/2010 | Chehab | |
| 2013/0283842 A1 * | 10/2013 | Heyse | B60H 3/0608 62/324.2 |
| 2014/0314568 A1 * | 10/2014 | Vetters | F01D 11/24 416/1 |
| 2017/0114667 A1 * | 4/2017 | Sabo | F01D 25/145 |
| 2017/0114725 A1 * | 4/2017 | Holt | F01D 11/24 |
| 2017/0342994 A1 | 11/2017 | Nesteroff et al. | |
| 2017/0342995 A1 | 11/2017 | Ottow et al. | |
| 2017/0342996 A1 | 11/2017 | Nesteroff et al. | |
| 2017/0343001 A1 | 11/2017 | Nesteroff et al. | |
| 2017/0343002 A1 | 11/2017 | Ottow et al. | |
| 2018/0094584 A1 * | 4/2018 | Chalaud | F02C 7/224 |

\* cited by examiner

SYSTEM AND METHOD OF CONTROLLING TIP CLEARANCE IN A SHROUD ASSEMBLY FOR A BLADED DISC

CROSS-REFERENCE TO RELATED APPLICATIONS

This application claims priority to U.S. Provisional Application No. 62/577,845, filed on Oct. 27, 2017, the entirety of which is hereby incorporated by reference.

FIELD OF THE DISCLOSURE

The present disclosure relates generally to rotating machines, and more specifically to systems and methods of controlling the clearance between a bladed disc and a shroud in a rotating machine.

BACKGROUND

Rotating machines may comprise a bladed disc, typically attached to a rotating shaft, encased by a shroud. Examples include axial compressors, centrifugal compressors, and turbines.

In many applications of rotating machines, such as a gas turbine engine, systems and methods are employed to ensure an appropriate gap is maintained between the blade tips of the bladed disc and the shroud. This gap is often referred to as the blade tip clearance, and is an important factor in determining the efficiency of an engine. An insufficient gap increases the risk that a blade tip will impinge—or rub—against the shroud, potentially damaging one or both of the blades and shroud and ultimately reducing engine efficiency. Conversely, when an excessive gap exists gasses flowing through the engine may pass between the blade tips and the shroud, thus constituting leakage which also reduces the engine efficiency. Maintaining an appropriately-size blade tip clearance through a wide range of operating conditions and transients is therefore important to the efficient operation of a turbine engine or, indeed, many rotating machines.

SUMMARY

According to some aspects of the present disclosure, an assembly in a turbine engine has a dynamically moveable shroud segment for encasing a rotor segment comprising a bladed disc and for maintaining a clearance gap between the shroud segment and the blade tips of the bladed disc. The assembly comprises a static engine casing; a rotor segment comprising a bladed disc; a shroud segment carried by said casing, said shroud segment comprising a flowpath boundary member being moveable relative to the blade tips of the bladed disc by thermal expansion and contraction of said member; and an actuator for effecting thermal expansion and contraction of said flowpath boundary member. The actuator comprises a closed form refrigeration system having an evaporator, a compressor, a condenser, an expansion valve, and a refrigerant contained therein, wherein said refrigeration system evaporator is positioned in sufficient proximity to said flowpath boundary member to extract heat from said member.

In some embodiments said bladed disc comprises a turbine rotor carrying a plurality of turbine blades. In some embodiments said bladed disc comprises an axial compressor rotor carrying a plurality of compressor blades. In some embodiments said refrigeration system evaporator comprises a metal foam. In some embodiments the evaporator is mounted to the casing.

In some embodiments the actuator is configured to actuate responsive to a sensed clearance gap. In some embodiments the actuator is configured to actuate responsive to a sensed temperature. In some embodiments the evaporator is mounted to the flowpath boundary member.

According to another aspect of the present disclosure, a system for maintaining a clearance gap between a shroud and blade tips of a rotatable bladed disc in a turbine engine comprises a rotor segment comprising a bladed disc; a static casing encasing the bladed disc; a shroud segment carried by said casing, said shroud segment comprising a flowpath boundary member being moveable relative to the blade tips of the bladed disc; and an actuator comprising a closed form refrigeration system having an evaporator, a compressor, a condenser, an expansion valve, and a refrigerant contained therein, wherein operation of said refrigeration system affects movement of said flowpath boundary member relative to said blade tips.

In some embodiments the flowpath boundary member comprises a ring configured for radial flexion. In some embodiments the evaporator of said refrigeration system is positioned in sufficient proximity to said flowpath boundary member to effect thermal expansion and contraction of said flowpath boundary member.

In some embodiments the evaporator is mounted to the static casing. In some embodiments the evaporator is mounted to the flowpath boundary member.

In some embodiments the system further comprises at least one thermoelectric cooler disposed within the evaporator. In some embodiments the evaporator comprises open cell metal foam. In some embodiments the system further comprises a refrigerant tube wound about an axis of rotation of the bladed disc and disposed within the evaporator, the refrigerant tube adapted to circulate refrigerant therethrough. In some embodiments the system further comprises at least one insulating layer disposed radially outward from the evaporator. In some embodiments the system further comprises a sensor disposed on the flowpath boundary member and configured to measure the clearance gap.

According to yet another aspect of the present disclosure, in a turbine engine having a static casing and a rotatable bladed disc, a method of reducing blade tip rub comprises providing a flowpath boundary member spaced radially inward from the casing to form a flowpath boundary around the bladed disc; thermally coupling the flowpath boundary member to a closed form refrigeration system having an evaporator, a compressor, a condenser, an expansion valve, and a refrigerant contained therein; and thermally expanding or contracting the flowpath boundary member by removing heat via the refrigeration system to affect movement of the flowpath boundary member relative to blade tips of the bladed disc.

In some embodiments the method further comprises measuring a clearance gap between the blade tips of the rotatable bladed disc and the flowpath boundary member; and thermally expanding or contracting the flowpath boundary member responsive to the measured clearance gap.

In some embodiments the method further comprises measuring an internal temperature of the evaporator; and thermally expanding or contracting the flowpath boundary member responsive to the measured temperature.

BRIEF DESCRIPTION OF THE DRAWINGS

The following will be apparent from elements of the figures, which are provided for illustrative purposes and are not necessarily to scale.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments illustrated in the drawings and specific language will be used to describe the same.

Existing systems for controlling blade tip clearance typically divert pressurized air streams from elsewhere in a rotating machine (i.e. inner stage compressor air in a turbine engine) and use the diverted air to pneumatically operate a movable shroud. The systems may also use diverted air to maintain or control the temperature of the movable shroud. By controlling the flow of the diverted air to actuate the moveable shroud, the position of the shroud may be controlled relative to the rotating blades to thereby control the blade tip clearance.

Unfortunately, these existing systems that use diverted air rely on a supply of clean air to be available to the engine, as is typically experienced by large- to medium-sized turbine engines when operating at appropriate altitude fixed to an aircraft. However, smaller engines or engines more typically used in environments with high particulate concentrations will not have access to a supply of clean air required to make existing systems successful. Further, small turbine engines may not be designed with sufficient airflow to allow any air to be diverted for tip clearance purposes. For example, the use of internal, diverted air sources removes energy from the engine cycle and therefore reduces engine efficiency; in smaller engines, removing energy in this fashion may simply not be an acceptable design option.

The present disclosure is directed to systems and methods to overcome the aforementioned shortcomings of the prior art. More specifically, the present disclosure is directed to a closed form approach to blade tip clearance control that does not rely on diverting potentially dirty air streams from elsewhere in the engine. The present disclosure is directed to the use of a closed form refrigeration system to thermally actuate movement of the shroud to thereby control the positioning of the shroud relative to a bladed disc.

Figure 1:
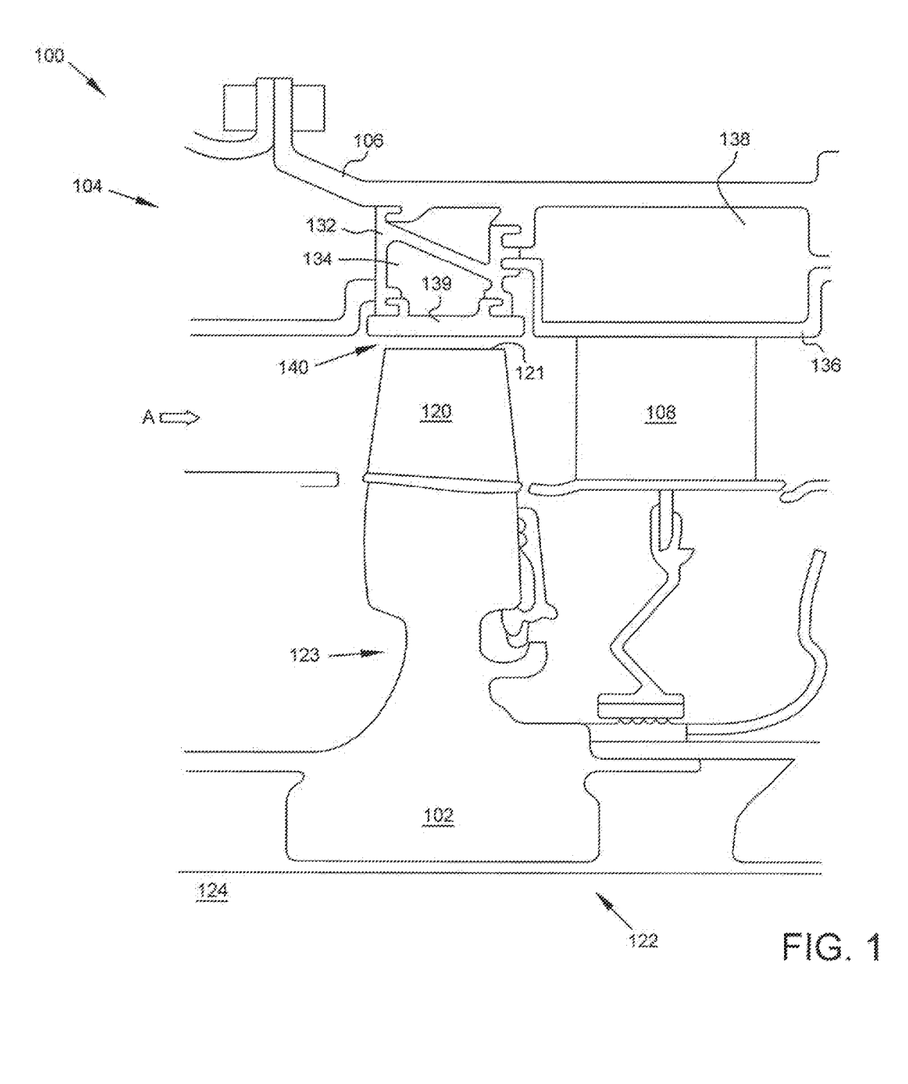
FIG. 1 is a cross-sectional view of a turbine section of a turbine engine.

FIG. 1 illustrates a cross-sectional view of a typical assembly 100 of a gas turbine engine. Assembly 100 comprises a rotor segment 122 encased by a shroud segment 104. Rotor segment 122 comprises a bladed disc 102. Shroud segment 104 comprises a flowpath boundary member 139 coupled to an engine casing 106 via a hanger 132. In the illustrated assembly 100 a static vane 108 is located downstream of the bladed disc 102. The vane 108 and disc 102 may collectively be referred to as a turbine stage or compressor stage.

Fluid flow in the illustrated assembly 100 is from left to right as indicated by Arrow A. In an embodiment where assembly 100 represents a gas turbine stage, hot combustion gases exit the combustor (not shown) and flow downstream across the bladed disc 102 and vane 108 of the assembly 100.

Bladed disc 102 comprises a plurality of blades 120 coupled to a disc 123. Disc 123 is coupled to rotatable shaft 124, and may rotate at high speed during engine operation. The centerline axis of the shaft 124 may define an axis of rotation for the assembly 100.

A shroud segment 104 is disposed radially outward from the bladed disc 102. Shroud segment 104 comprises a flowpath boundary member 139 coupled to an engine casing 106 via a hanger 132. Flowpath boundary member 139 may be a continuous annular member or may be circumferentially segmented. A blade plenum 134 may be formed between casing 106 and flowpath boundary member 139.

A ring bracket 136 may be disposed radially outward from vane 108, and may be coupled to a radially outward end of the vane 108. A vane plenum 138 may be formed between casing 106 and ring bracket 136.

In the assembly 100 of FIG. 1, the blade tip clearance 140 is the gap between a tip 121 of blade 120 and flowpath boundary member 139. The blade tip clearances in the Figures of the present disclosure are exaggerated for illustrative purposes. Blade tip clearance 140 may be referred to as the clearance gap.

During operation of the gas turbine engine, and assembly 100 of FIG. 1, transients and changes in operating conditions may alter the maximum radial extent of blade tip 121. For example, as the engine heats following a cold start, the temperature of the bladed disc 102 rises causing thermal expansion of the bladed disc, thereby moving blade tip 121 closer to flowpath boundary member 139. To ensure a sufficient blade tip clearance 140 such that a blade tip 121 does not impinge on flowpath boundary member 139, while also maintaining engine efficiency, it is desirable to implement systems and methods of controlling the radial position of the flowpath boundary member 139 relative to the blade tips 121.

Figure 2:
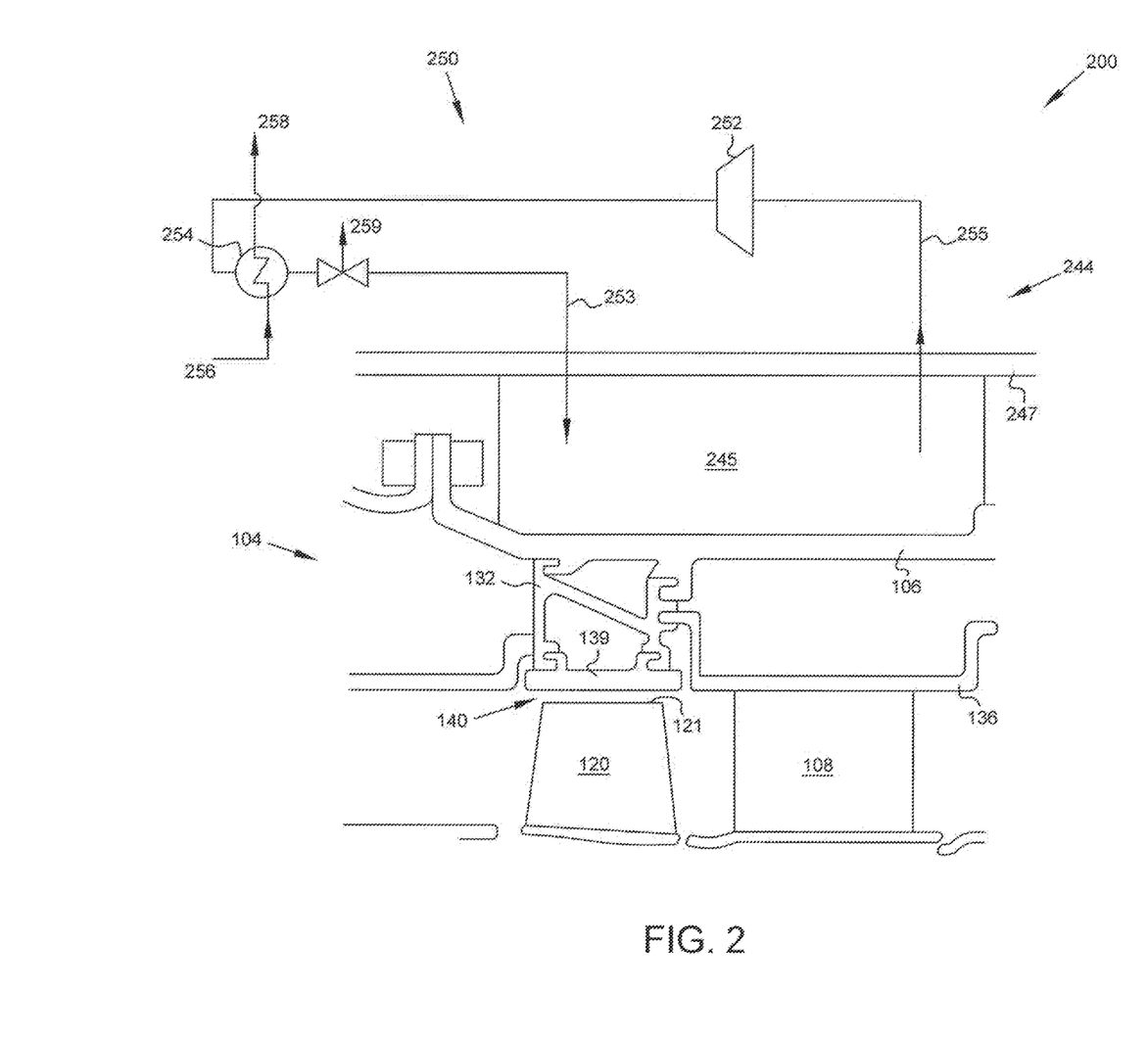
FIG. 2 is a cross-sectional and schematic view of a turbine section of a turbine engine in accordance with some embodiments of the present disclosure.

FIG. 2 presents a cross-sectional view of a turbine section of a gas turbine engine in accordance with some embodiments of the present disclosure. Assembly 200 provides for the control of the radial position of flowpath boundary member 139 to thereby effect an appropriate blade tip clearance. Flowpath boundary member 139 may therefore be dynamically moveable. Assembly 200 comprises rotor segment 122, shroud segment 104, and an actuator 244.

Actuator 244 comprises a closed form refrigeration system 250. Refrigeration system 250 comprises a refrigeration compressor 252, refrigeration condenser 254, expansion valve 259, and evaporator 245.

Refrigeration system 250 may further comprise an inlet 253 and discharge 255 for conveying refrigerant to and from the evaporator 245. Multiple inlets 253 and discharges 255 may be provided and circumferentially spaced about the evaporator 245 to ensure even circumferential distribution of refrigerant.

Evaporator 245 may be coupled or mounted to casing 106. In some embodiments, evaporator 245 may be disposed proximate the casing 106, or may be abutting the casing 106. When refrigerant is flowing through the evaporator 245, heat is drawn from the flowpath boundary member 139 to thereby effect thermal contraction of the flowpath boundary member 139.

Evaporator 245 may be a continuous annular ring or may be formed in circumferential segments. In some embodiments, evaporator 245 comprises metal foam 700 (shown in FIG. 7). The metal foam 700 may be open cell or closed cell. Evaporator 245 may be enclosed within a containment (not shown) to assist with containing and directing the flow of refrigerant through the evaporator 245.

Flowpath boundary member 139 is carried by casing 106. In the illustrated embodiment, flowpath boundary member 139 is carried by casing 106 via hanger 132. Flowpath boundary member 139 and hanger 132 collectively form the shroud segment 104. Flowpath boundary member 139 may form all or a portion of a flowpath boundary around the rotatable bladed disc 102.

During operation, refrigerant is circulated into the refrigeration compressor 252 as a saturated vapor and is compressed to a higher pressure, resulting in a higher temperature as well. The hot, compressed refrigerant is a superheated vapor and it is at a temperature and pressure at which it can be condensed with either a cooling liquid (like fuel) or cooling air.

The circulating refrigerant rejects heat from the system at the refrigeration condenser 254. A cooling source 256 provides a cooling medium which flows through a heat exchanger of the condenser 254 and results in a hot exhaust 258. The rejected heat from the refrigerant is carried away by the cooling medium.

The refrigerant is now a saturated liquid and is routed through expansion valve 259 where it undergoes an abrupt reduction in pressure. That pressure reduction results in the adiabatic flash evaporation of a part of the liquid refrigerant. The auto-refrigeration effects of the adiabatic flash evaporation lowers the temperature of the liquid and vapor refrigerant mixture to where it is colder than the temperature of the enclosed space or surface to be refrigerated. In some embodiments expansion valve 259 may be used to throttle flow of refrigerant through refrigeration system 250.

The cold mixture is then routed through the evaporator 245. Heat from the relatively hot casing 106 evaporates the liquid part of the cold refrigerant mixture. At the same time, the casing 106 is cooled and thus lowers the temperature of the casing 106 to the desired temperature. Through action of the refrigeration system heat is removed from casing 106, hanger 132, and flowpath boundary member 139. This heat removal causes thermal contraction of each component, and the thermal contraction moves the flowpath boundary member 139 relative to the blade tips 121. Altering the rate of heat removal may remove less heat, thus allowing for thermal expansion of casing 106, hanger 132, and/or flowpath boundary member 139, resulting in movement of the flowpath boundary member 139 relative to the blade tips 121. Changes in the rate of heat removal by the actuator 244 allow for controlling the thermal expansion and contraction of casing 106, hanger 132, and/or flowpath boundary member 139, and thus controlling the position of the flowpath boundary member 139 relative to the blade tips 121.

The evaporator 245 is where the circulating refrigerant absorbs and removes heat which is subsequently rejected in the condenser 254 and transferred elsewhere by the cooling medium. To complete the refrigeration cycle, the refrigerant vapor from the evaporator 245 is routed back into the compressor 252 as a saturated vapor.

Evaporator 245 removes heat from casing 106, hanger 132, and/or flowpath boundary member 139. As casing 106, hanger 132, and/or flowpath boundary member 139 comprise a thermally responsive material, by altering the rate of heat removal from the casing 106, hanger 132, and/or flowpath boundary member 139 the expansion and/or contraction of the casing 106, hanger 132, and/or flowpath boundary member 139 may be controlled. Causing the casing 106, hanger 132, and/or flowpath boundary member 139 to expand will serve to re-position the flowpath boundary member 139 in a radially outward manner, while causing the casing 106, hanger 132, and/or flowpath boundary member 139 to contract will serve to re-position the flowpath boundary member 139 in a radially inward manner. Thus, small adjustments to the temperature of casing 106, hanger 132, and/or flowpath boundary member 139 may be effective to control and maintain an appropriate blade tip clearance 140.

Control of the rate of heat removal may be affected by controlling the flow rate of refrigerant through refrigeration system 250, or by controlling the flow rate of cooling medium through condenser 254. Operating parameters to include blade tip clearance 140 and temperatures of various components of the assembly 200 may be monitored to provide indications of necessary adjustments to the refrigeration system 250. For example, in some embodiments a temperature sensor monitors an internal temperature of the evaporator 245 and cooling is throttled to maintain a desired internal temperature that correlates to a desired blade tip clearance 140.

In some embodiments, the evaporator 245 may be configured to thermally expand and contract to affect movement of the flowpath boundary member 139 relative to the blade tips 121. Evaporator 245 may be configured for radial flexion. Evaporator 245 may comprise materials adapted to expand and contract responsive to thermal inputs.

In some embodiments evaporator 245 may be integrally formed with casing 106, or the casing 106 may be formed from a material adapted to expand and contract responsive to thermal inputs such that the casing 106 serves as the evaporator 245.

Materials for an engine casing, such as casing 106, are typically selected based on a lack of thermal responsiveness, that is a relative minimal expansion and contraction responsive to thermal changes. However, in the illustrated embodiment casing 106 may be formed from a material adapted to expand and contract at a given rate responsive to thermal changes, and more particularly a material that has a higher rate of expansion and contraction responsive to thermal changes than is typically used for an engine casing.

In some embodiments, such as embodiments having an evaporator 245 comprising metal foam 700 (see FIG. 7), refrigerant flows directly through the evaporator 245, for example through the metal foam 700. In other embodiments, refrigerant may flow through tubing in the evaporator 245. For example, a continuous coil of tubing may be wound about the radially outward facing surface of the casing 106 and disposed within the evaporator 245 in order to circulate refrigerant therethrough.

One or more insulating layers 247 may be disposed radially outward from evaporator 245 to improve efficiency of the refrigeration system 250.

Figure 3:
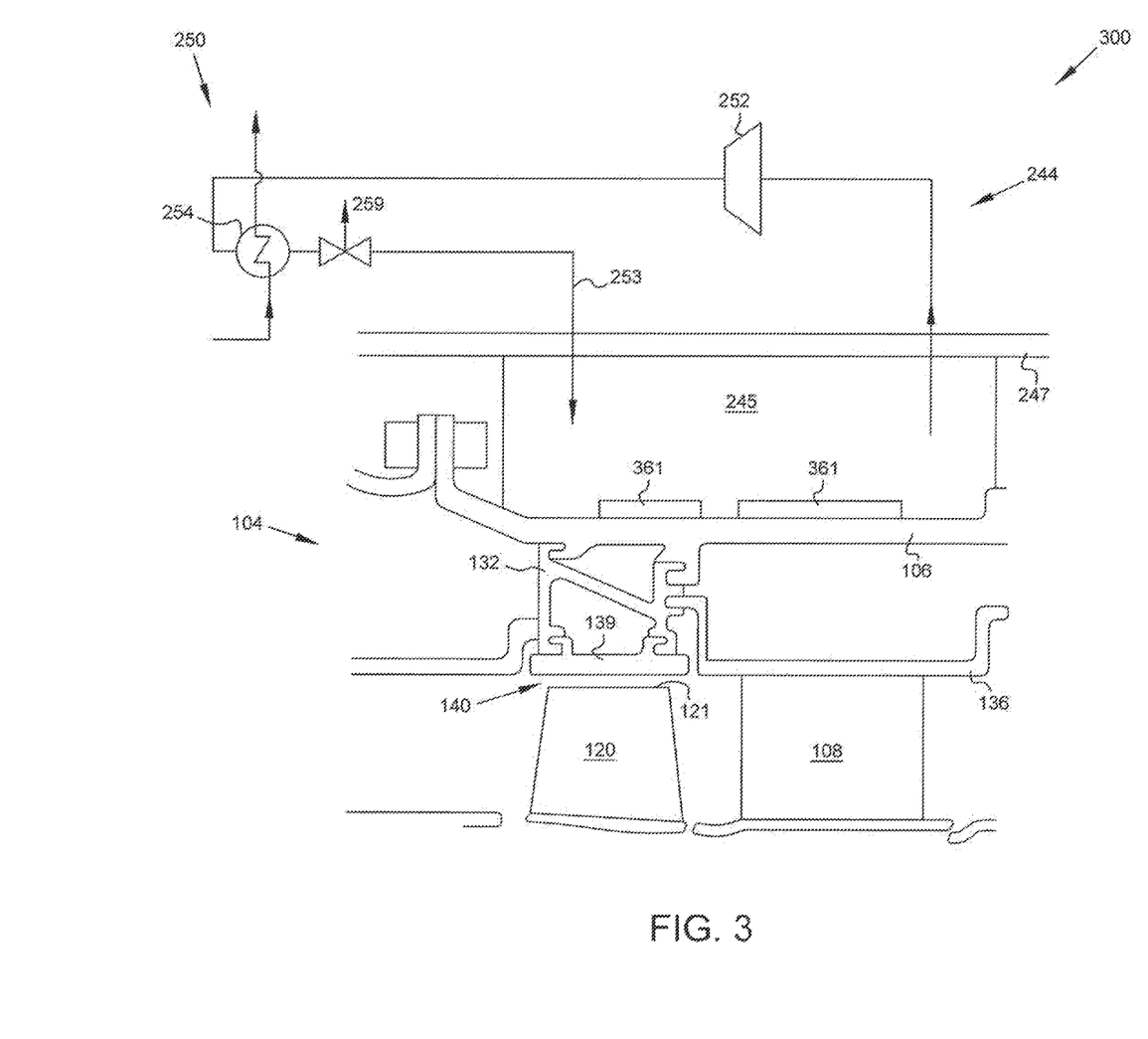
FIG. 3 is a cross-sectional and schematic view of a turbine section of a turbine engine in accordance with some embodiments of the present disclosure.

FIG. 3 presents a cross-sectional and schematic view of an assembly 300 in accordance with some aspects of the present disclosure. In the embodiment of FIG. 3, one or more thermoelectric coolers 361 are coupled to or mounted to casing 106 and disposed within evaporator 245. Thermoelectric coolers 361 may be a Peltier cooler or similar device. The thermoelectric coolers 361 may assist refrigeration system 250 with adequately cooling the casing 106, or may be used to make small adjustments to the temperature of casing 106 whereas the refrigeration system 250 is used for bulk heat removal. By allowing for more incremental control of the temperature of casing 106, thermoelectric coolers 361 improve the granularity of control of blade tip clearance 140.

Figure 4:
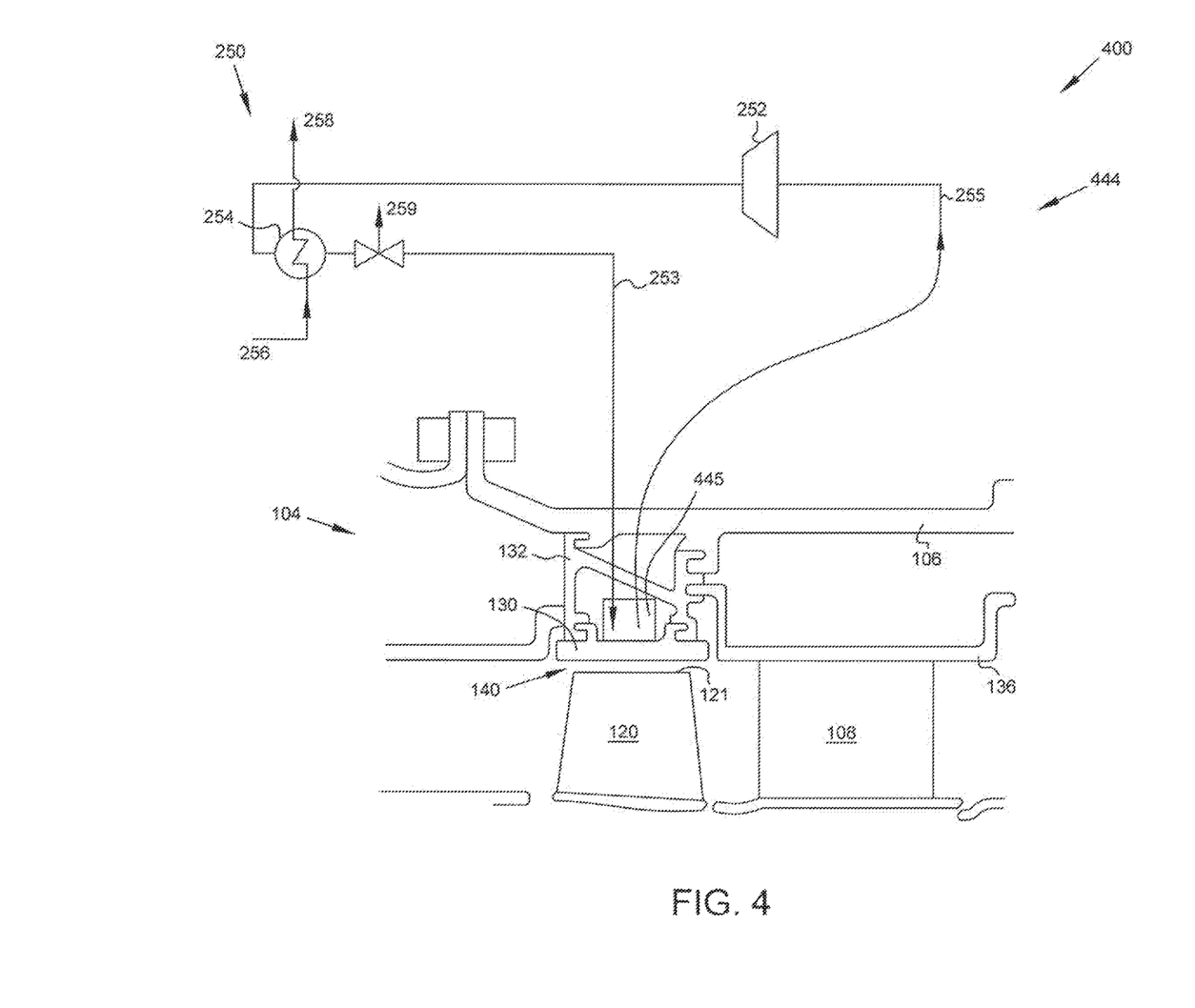
FIG. 4 is a cross-sectional and schematic view of a turbine section of a turbine engine in accordance with some embodiments of the present disclosure.

FIG. 4 presents a cross-sectional and schematic view of an assembly 400 in accordance with some aspects of the present disclosure. In the embodiment of FIG. 4, evaporator 445 is coupled or mounted to flowpath boundary member 139 to allow for more direct heat removal from the flowpath boundary member 139 and potentially greater control of the thermal expansion and contraction of that member 139. In some embodiments, flowpath boundary member 139 may be circumferentially segmented to allow for expansion and contraction around the blade tips 121, or flowpath boundary member 139 may comprise a material adapted for desired expansion and contraction.

Figure 7:
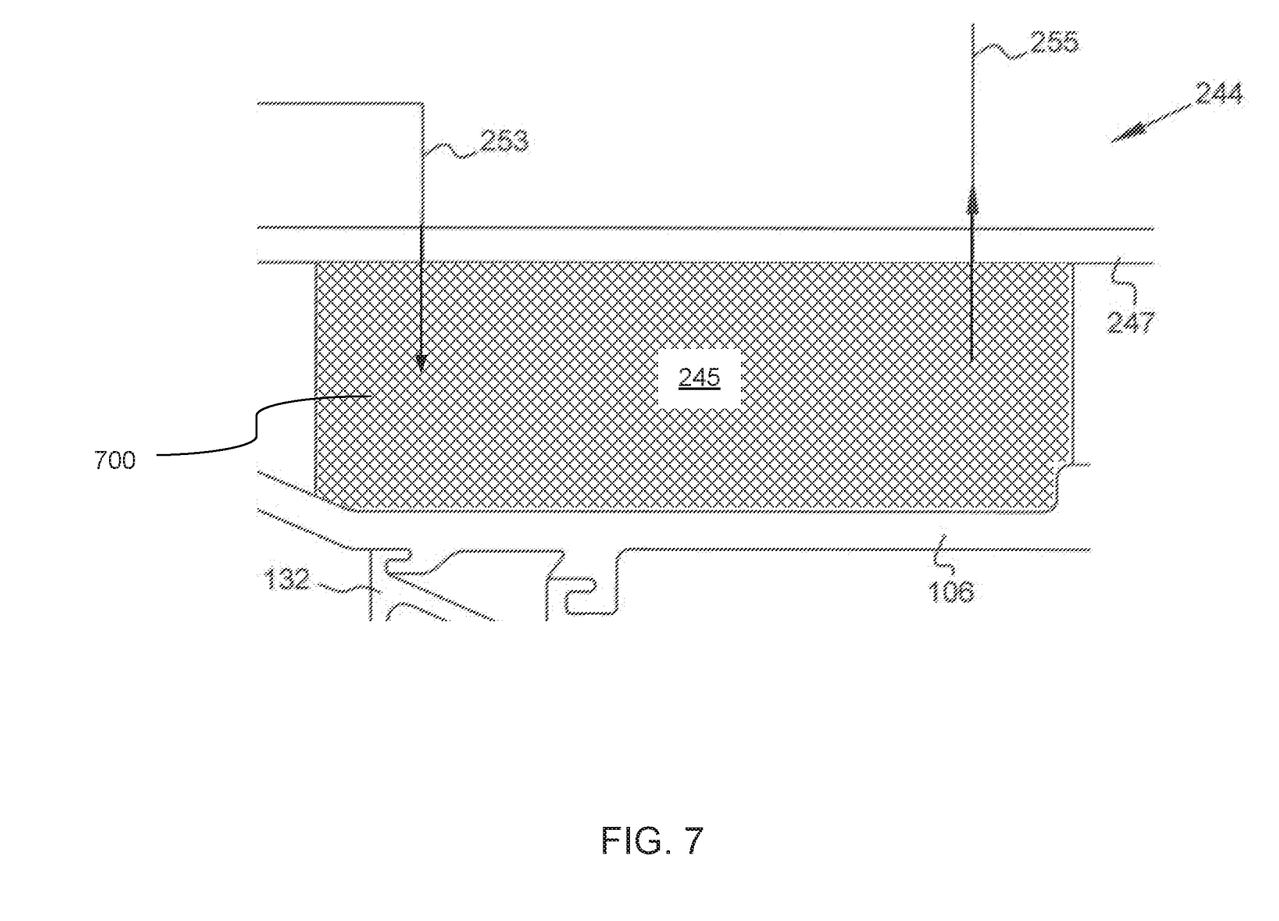
FIG. 7 is a partial cross-sectional view of an evaporator in accordance with some embodiments of the present disclosure.

Evaporator 445 may be formed as a continuous annular member or may be circumferentially segmented. In some embodiments, evaporator 445 comprises metal foam 700. The metal foam 700 may be open cell or closed cell. Evaporator 445 may be enclosed within an actuator containment (not shown) to assist with containing and directing the flow of refrigerant through the actuator. In some embodiments evaporator 445 may be integrally formed with flowpath boundary member 139, or the flowpath boundary member 139 may be formed from a material adapted to expand and contract responsive to thermal inputs such that the flowpath boundary member 139 serves as the evaporator 445. Evaporator 445 may itself comprise material adapted to expand and contract responsive to thermal inputs.

Although refrigeration system 250 is schematically depicted outside of casing 106, all or portions of refrigeration system 250 may be disposed either outside or inside casing 106.

Controlling the rate of heat removal from the evaporator 445 via refrigeration system 250 enables control of the expansion and/or contraction of the flowpath boundary member 139. By controlling expansion and contraction of the flowpath boundary member 139, the radial position of the flowpath boundary member 139 may be controlled relative to the blade tips 121 and therefore the blade tip clearance 140 may be set to an appropriate distance.

The above embodiments may be implemented in a compressor or turbine of a turbine engine, or in similar rotating structures. Bladed disc 102 may be the compressor rotor of an axial compressor, the turbine rotor of an axial turbine, or a similar rotating device.

Figure 5:
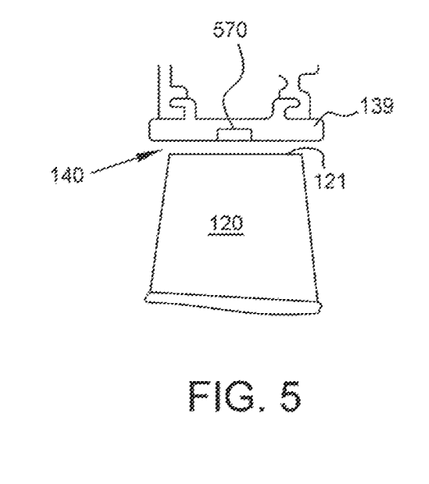
FIG. 5 is a partial cross-sectional view of a turbine blade a shroud having a clearance sensor in accordance with some embodiments of the present disclosure.

FIG. 5 is a detailed cross-sectional view of a turbine blade 120 and flowpath boundary member 139 having a sensor 570 positioned to monitor blade tip clearance 140. In some embodiments, a sensor 570 maybe used to measure a blade tip clearance 140 and flowpath boundary member 139 position relative to blade tips 121 may be controlled based on the measured blade tip clearance 140. A measurement may be taken at a fixed interval, or may be taken at varying periods as operations dictate. Control may entail increasing or decreasing the rate of heat removal by refrigeration system 250 therefore moving a flowpath boundary member 139 closer to or further from blade tips 121.

In other embodiments the blade tip clearance 140 may not be directly measured by a sensor 570 but may be inferred by monitoring various engine parameters, such as power setting, and/or temperatures and pressures of air flowing through the inlet and outlet of the turbine or centrifugal compressor. The radial position of a flowpath boundary member 139 may be controlled—thus altering the blade tip clearance—according to a predetermined schedule that is based on measured engine parameters.

Figure 6:
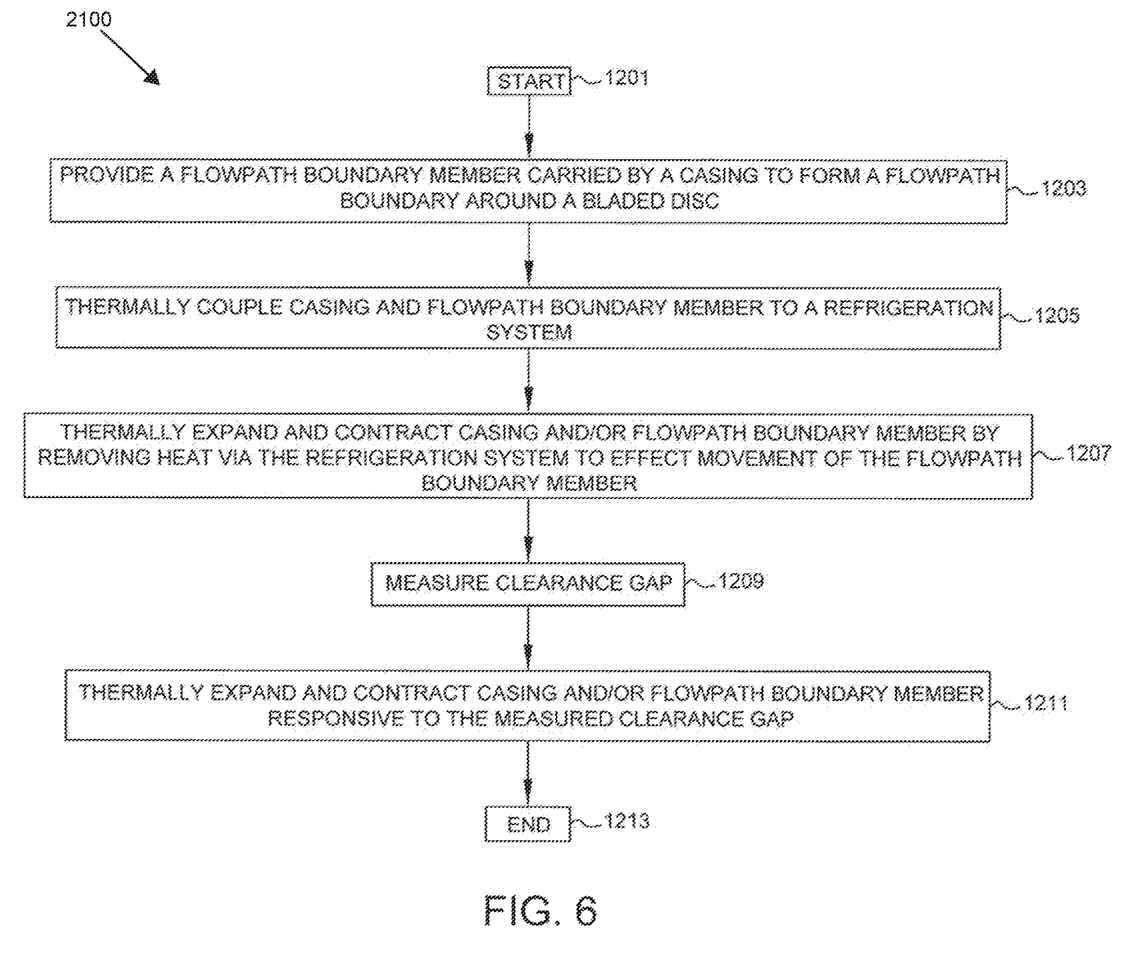
FIG. 6 is a flow diagram of a method of reducing blade tip rub in accordance with some embodiments of the present disclosure.

The present disclosure further provides methods of reducing blade tip rub in rotating machinery. FIG. 6 is a flow diagram of a method 1200 of reducing blade tip rub in accordance with some embodiments of the present disclosure. Method 1200 starts at block 1201.

At block 1203, a flowpath boundary member is provided that is carried by a casing and forms a flowpath boundary around a rotatable bladed disc. The flowpath boundary member, casing, and rotatable bladed disc may be substantially as described above with reference to FIGS. 1-5.

The casing and/or flowpath boundary member are thermally coupled to a refrigeration system at block 1205. The casing and/or flowpath boundary member may be thermally coupled via an evaporator. The evaporator may be mounted to the casing or the flowpath boundary member. The refrigeration system and evaporator may be substantially as described above with reference to FIGS. 1-5.

At block 1207, the casing and/or flowpath boundary member are thermally expanded or contracted by removing heat using the refrigeration system. By expanding and contracting the casing and/or flowpath boundary member, movement of the flowpath boundary member that is carried by the casing is controlled. The flowpath boundary member may move radially inward or radially outward, thus decreasing or increasing, respectively, the blade tip clearance between the blade tips of the rotatable bladed disc and the flowpath boundary member.

Blocks 1209 and 1211 in method 1200 are optional. At block 1209 the blade tip clearance may be measured, and at block 1211 the casing and/or flowpath boundary member may be thermally expanded or contracted responsive to the measured blade tip clearance. The blade tip clearance may be measured and/or monitored by a sensor, and the sensor may be mounted to the flowpath boundary member. Alternatively, the blade tip clearance may be inferred by measurements of engine operating parameters, and the casing and/or flowpath boundary member may be thermally expanded or contracted responsive to the inferred blade tip clearance. In yet further embodiments, the temperature of the evaporator may be monitored by a sensor and the casing and/or flowpath boundary member may be thermally expanded or contracted responsive to the measured temperature.

Method 1200 ends at Block 1213. Method 1200 may be used to reduce and/or eliminate blade tip rub, as well as improve efficiency of rotating machinery by ensuring an appropriate blade tip clearance is maintained across all operating conditions.

The refrigeration system of the present disclosure may be modestly sized. Appropriate blade tip clearances may be obtained with fluctuations in actuator temperature of as little as 200 to 300° F.

The refrigerant used in the disclosed refrigeration system may be Freon, nitrogen, or similar known refrigerant.

The present disclosure provides numerous advantages over prior art blade tip clearance control systems and methods. By providing a refrigeration system to remove heat and thereby affect movement of a flowpath boundary member relative to a rotatable bladed disc, the present disclosure allows for blade tip clearance control without requiring the diversion of air streams from other portions of the engine. This ensures sufficient air flow in other portions of the engine and improves engine efficiency. Also, by providing a closed system the concern for particulate interference with blade tip clearance control is greatly reduced.

The present disclosure also achieves blade tip clearance control with minimal additional loading. A small amount of electrical power is required to run the refrigeration compressor, but the loading cost of the present disclosure is significantly less than prior systems that rely on diverted air streams to effect blade tip clearance control.

The present application discloses one or more of the features recited in the appended claims and/or the following features which, alone or in any combination, may comprise patentable subject matter.

Although examples are illustrated and described herein, embodiments are nevertheless not limited to the details shown, since various modifications and structural changes may be made therein by those of ordinary skill within the scope and range of equivalents of the claims.

What is claimed is:

1. An assembly in a turbine engine having a dynamically moveable shroud segment for encasing a rotor segment comprising a bladed disc and maintaining a clearance gap between the shroud segment and a plurality of blade tips of the bladed disc, said assembly comprising:
    a static engine casing;
    a rotor segment comprising a bladed disc;
    a shroud segment carried by said casing, said shroud segment comprising a flowpath boundary member coupled to the static engine casing via a hanger, wherein the hanger and the flowpath boundary member are both moveable relative to the blade tips of the bladed disc by thermal expansion and contraction of said flowpath boundary member and the hanger; and
    an actuator for effecting thermal expansion and contraction of said flowpath boundary member, said actuator comprising a closed form refrigeration system having an evaporator, a compressor, a condenser, an expansion valve, and a refrigerant contained therein, wherein said evaporator is positioned in sufficient proximity to the hanger and said flowpath boundary member to extract heat from the hanger and said flowpath boundary member.

2. The assembly of claim 1 wherein said bladed disc comprises a turbine rotor carrying a plurality of turbine blades.

3. The assembly of claim 1 wherein said bladed disc comprises an axial compressor rotor carrying a plurality of compressor blades.

4. The assembly of claim 1 wherein said evaporator comprises a metal foam.

5. The assembly of claim 1 wherein the evaporator is mounted to the casing.

6. The assembly of claim 1 wherein the assembly further comprises a sensor configured to monitor the clearance gap, and wherein the actuator is configured to actuate responsive to the clearance gap sensed by the sensor.

7. The assembly of claim 1 wherein the assembly further comprises a temperature sensor, and wherein the actuator is configured to actuate responsive to a temperature sensed by the temperature sensor.

8. The assembly of claim 1 wherein the evaporator is mounted to the flowpath boundary member.

9. A system for maintaining a clearance gap between a shroud and a plurality of blade tips of a rotatable bladed disc in a turbine engine, said system comprising:
    a rotor segment comprising a bladed disc;
    a static casing encasing the bladed disc;
    a shroud segment carried by said casing, said shroud segment comprising a flowpath boundary member coupled to the static casing via a hanger, wherein the hanger and the flowpath boundary member are both moveable relative to the blade tips of the bladed disc; and
    an actuator comprising a closed form refrigeration system having an evaporator, a compressor, a condenser, an expansion valve, and a refrigerant contained therein, wherein operation of said closed form refrigeration system affects movement of the hanger and said flowpath boundary member relative to said blade tips.

10. The system of claim 9 wherein the flowpath boundary member comprises a ring configured for radial flexion.

11. The system of claim 9 wherein the evaporator of said closed form refrigeration system is positioned in sufficient proximity to said flowpath boundary member to effect thermal expansion and contraction of said flowpath boundary member.

12. The system of claim 11 wherein the evaporator is mounted to the static casing.

13. The system of claim 12 further comprising at least one thermoelectric cooler disposed within the evaporator.

14. The system of claim 11 wherein the evaporator is mounted to the flowpath boundary member.

15. The system of claim 9 wherein the evaporator comprises open cell metal foam.

16. The system of claim 9 further comprising at least one insulating layer disposed radially outward from the evaporator.

17. In a turbine engine having a static casing and a rotatable bladed disc, a method of reducing blade tip rub comprising:
    providing a flowpath boundary member spaced radially inward from the casing to form a flowpath boundary around the bladed disc;
    thermally coupling the flowpath boundary member to a closed form refrigeration system via a hanger, the closed form refrigeration system having an evaporator, a compressor, a condenser, an expansion valve, and a refrigerant contained therein; and
    thermally expanding or contracting the hanger and the flowpath boundary member by removing heat via the closed form refrigeration system to affect movement of the hanger and the flowpath boundary member relative to a plurality of blade tips of the bladed disc.

18. The method of claim 17 further comprising:
    measuring, via a sensor, a clearance gap between the blade tips of the rotatable bladed disc and the flowpath boundary member; and
    thermally expanding or contracting the flowpath boundary member responsive to the clearance gap measured by the sensor.

19. The method of claim 17 further comprising:
    measuring, via a sensor, an internal temperature of the evaporator; and thermally expanding or contracting the flowpath boundary member responsive to the internal temperature measured by the sensor.

\* \* \* \* \*